Feb. 19, 1952     E. R. WILLIAMS     2,586,410
LIQUID LEVEL CONTROL

Filed May 10, 1946     2 SHEETS—SHEET 1

Elmer R. Williams
INVENTOR

BY Philip A. H. Terrell
ATTORNEY

Elmer R. Williams
INVENTOR

BY Philip A. H. Terell
ATTORNEY

Patented Feb. 19, 1952

2,586,410

UNITED STATES PATENT OFFICE 2,586,410

LIQUID LEVEL CONTROL

Elmer R. Williams, Tulsa, Okla.

Application May 10, 1946, Serial No. 668,966

6 Claims. (Cl. 137—68)

The invention relates to liquid level controls for oil and gas separators, in which there is a fluctuating oil column and gas pressure above the oil column, and has for its object to provide a liquid level and pressure maintaining device wherein oil is discharged from the separator when it exceeds a predetermined level, and gas is also discharged when the gas pressure above the oil exceeds a predetermined pressure.

A further object is to provide an oil level maintaining device comprising a diaphragm casing having a diaphragm therein interposed between oil and gas pistons cooperating with oil and gas discharge valves and means whereby oil will pass into the diaphragm casing, above the diaphragm and act on the upper side of the diaphragm for unseating the oil discharge valve when the liquid level in the separator rises, and means whereby gas will be allowed to discharge from above the liquid level when it exceeds a predetermined pressure.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
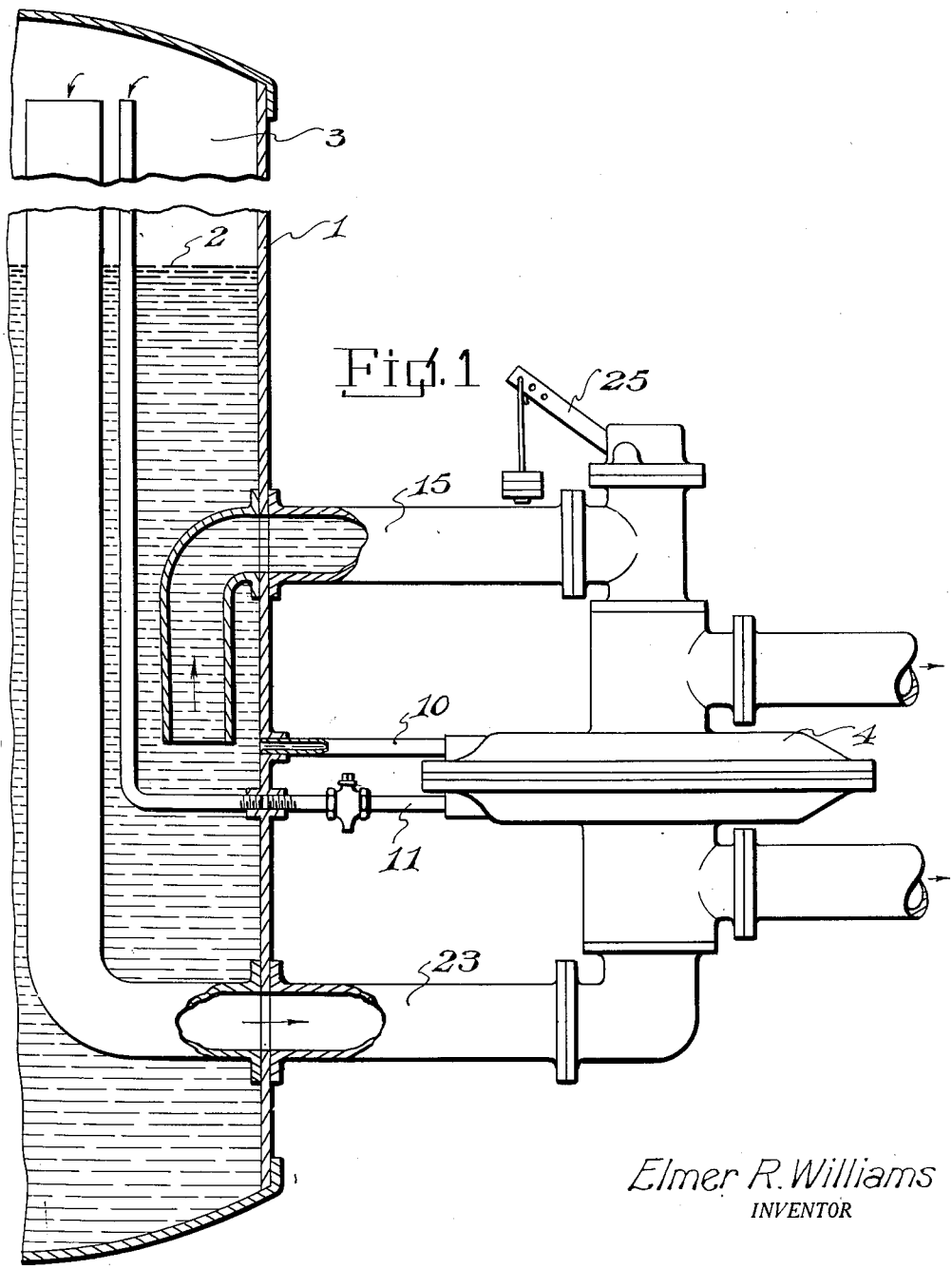
Figure 1 is a vertical sectional view through one side of the separator, showing the regulating device applied thereto.

Referring to the drawings, the numeral 1 designates an oil separator into which oil intermittently flows, and in which separator the liquid level 2 fluctuates, as well as the gas pressure, in the space 3 above the oil column. The present device is designed to maintain an oil level at a predetermined height and to maintain a predetermined gas pressure in the chamber 3. To accomplish this result a diaphragm casing 4 is provided, the chamber 5 of which is divided into an upper oil chamber 6 and a lower gas chamber 7 by a diaphragm 8 having stiffener plates 9 on opposite sides thereof. Oil flows into the oil chamber 6 through the pipe 10, connected to the separator 1 below the oil level 2, and gas flows into the gas chamber 7, through the gas supply pipe 11, which extends into the separator and thence upwardly through the oil column and terminates in the chamber 3, so the gas pressure, to be maintained, can act on the under side of the diaphragm 8.

Slidably mounted in the upper side of the casing 4, and extending into the oil chamber 6 is an oil piston 12, which effects the operation of an oil discharge valve 13, having guide fingers 14 in the oil discharge pipe 15, so oil can be discharged from the separator when the liquid level rises. Interposed between the oil piston 12 and the upper side of the diaphragm 8 is an expansion spring 16, which transmits the force of the diaphragm to the piston 12. To insure alinement a ball bearing 17 is interposed between the piston 12 and the oil discharge valve 13.

The gas piston 18 is larger than the oil piston 12, and interposed between the gas piston 18 and the underside of the diaphragm 8 is a spring 19, which is preferably stronger than the spring 16, the purposes of which will presently appear. Spring 19 forces the gas piston 18 downwardly against the bearing 20 carried by the upper side of the gas relief valve 21. Gas relief valve 21 cooperates with the valve seat 22 of the gas discharge pipe 23, which gas discharge pipe extends into the separator 1, and then upwardly through the oil column and terminates in the gas chamber 3 above the liquid. The dumping operation is intermittent, according to oil level and gas pressure and the combination thereof, and the oil discharge is only through the discharge pipe 15 and the gas through the discharge pipe 23. Pipes 10 and 11 only convey liquid and gas pressure to opposite sides of the diaphragm for operating the oil discharge valve 13 and the gas discharge valve 21.

The various valves and pistons are of different diameters. The oil valve 13 has an exposed diameter of three inches, that is from the inlet side and the oil piston 12 has an exposed diameter of two inches. The gas valve has a four inch exposure from the discharge pipe side and the gas piston 18 has a three inch exposure to the pressure in the gas chamber 7. The device is then set for the desired oil and gas pressures to be maintained in the separator, and consequently the liquid level; for instance if it is desired to maintain a column of oil which will weigh ten pounds, the gas pressure in the separator will be held at twenty-five pounds, therefore the active pressure of the oil will be thirty-five pounds for both oil and gas.

As an example of operation, without carrying the fractions of pounds and using the area set forth, the following will explain the operation.

Exposed area of oil valve 13 would be 7.0686 sq. inches times thirty-five pounds equals 247 pounds, which is down pressure on the oil valve.

Exposed area of oil piston 3.1416 sq. inches times thirty-five pounds equal 110 pounds. This force is up from the diaphragm chamber 6. It will be noted that this counteracting piston force against the force downwardly on the valve 13 leaves a difference of 137 pounds active pressure on the top of the oil valve.

Exposed area of gas valve 21 is 12.566 sq. inches times twenty-five pounds equals 314 pounds. This pressure is upwardly on the gas valve.

The exposed area of the gas piston 18 is 7.0686 sq. inches times twenty-five pounds which equals 177 pounds. This pressure is down from the diaphragm chamber 7.

It will be noted that this counteracting piston pressure against the pressure on the valve, leaves a difference of 137 pounds active pressure on the gas valve when the device is set for a twenty-five pound gas pressure and an oil pressure of thirty-five pounds per square inch. It is obvious that although oil valve and gas valve are of different diameters, as are the pistons, both valves require the same amount of force to become unseated, namely 137 pounds.

Figure 2:
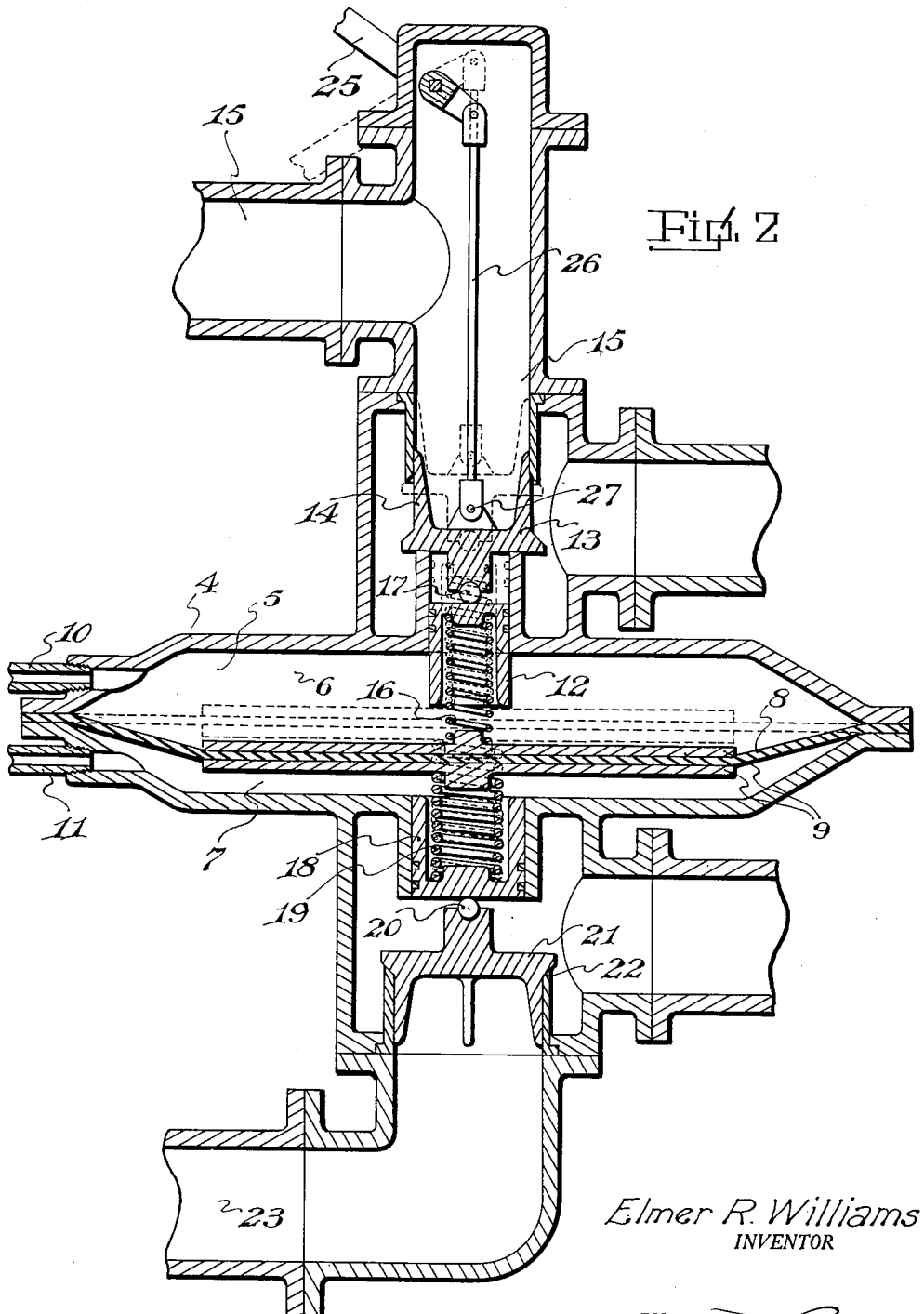
Figure 2 is a vertical longitudinal sectional view through the regulator.

Spring 19 is stronger than spring 16 to carry the dead weight of the diaphragm and its plates. If there were exactly twenty-five pound of gas acting on the under side of the diaphragm and a total of thirty-five pounds of oil and gas acting on the upper side of the diaphragm, the diaphragm would be held in the dotted line intermediate position in Figure 2. However each spring is strong enough to resist 137 pounds, and the bottom spring, in addition to the 137 pounds, the weight of the diaphragm and the oil column thereon.

To adjust or vary the liquid level, a weighted lever 25 is provided, and this lever has an oil valve stem 26 connected thereto, pivotally connected at 27 to the upper side of the oil valve. Assuming the device has been adjusted for maintaining the ten pound oil pressure and the twenty-five pound gas pressure, above set forth, and everything in the regulator is balanced to the dotted line position shown in Figure 2 upon a rise in the liquid column, the oil valve 13 would be unseated, and this would allow or permit a discharge of oil from the separator. During this flow, the diaphragm 8 would be pushed downwardly to the full line position shown in Figure 2, thereby compressing the gas piston spring 19, allowing a rise in the gas pressure in the chamber 3 above twenty-five pounds, which gas pressure will be added to the columnar pressure of the liquid and will assist in quickly forcing the liquid from the separator. When the oil column or level has lowered to a point where the excess pressure has been relieved from the top of the diaphragm the oil valve 13 will close and the gas valve will open because of the surplus gas pressure which has built up above the oil column during the flow of the oil, and when the gas pressure has been relieved the gas valve will again seat. Under certain conditions, where gushes of oil and gas enter the separator, the oil and gas valves will intermittently relieve these pressures in rapid succession.

From the above it will be seen that a regulator is provided for oil separators which will quickly relieve excess gas pressure and maintain a constant liquid level within the separator.

The invention having been set forth what is claimed as new and useful is:

1. A diaphragm controlled valve assembly adapted to maintain a constant liquid level and gas pressure in a receptacle, said assembly comprising a diaphragm casing, a diaphragm in said casing forming the same into an oil chamber and a gas chamber on opposite sides of the diaphragm communicating with the receptacle respectively, below and above the liquid level therein, an oil control valve on the oil chamber side of the diaphragm casing, means whereby oil pressure in the receptacle will maintain said valve open, weight means for closing said oil control valve when the pressure is reduced, a sliding piston within the oil chamber and co-operating with the oil control valve for unseating the oil control valve upon increase of pressure on the oil control valve and in the oil chamber, said piston being operatively connected to the diaphragm, a gas relief valve on the other side of the diaphragm casing and exposed to the gas pressure in the receptacle, a sliding piston within the gas chamber carried by the casing and cooperating with the gas relief valve, said second piston being operatively connected to the diaphragm.

2. A device as set forth in claim 1 wherein the oil control valve associated piston is smaller in area than the gas relief valve associated piston.

3. A device as set forth in claim 1 in which the connections are spring means under compression interposed between the pistons and the diaphragm.

4. A device as set forth in claim 1 wherein the connections are expansion springs under compression and are interposed between the pistons and opposite sides of the diaphragm, the spring between the oil associated piston and the diaphragm being weaker than the spring between the diaphragm and the gas associated piston.

5. A device as set forth in claim 1 including spherical bearing members interposed between the oil and gas associated pistons and the oil control and gas relief valves.

6. A device as set forth in claim 1 wherein the weight means is connected to the oil control valve by a lever and link connection interposed between the weight means and valve, the connection of the link to the valve being at a point on the axis of the valve.

ELMER R. WILLIAMS.

REFERENCES CITED

The following references are of record in the file of this patent:

UNITED STATES PATENTS

| Number | Name | Date |
|---|---|---|
| 1,620,096 | Harris | Mar. 8, 1927 |
| 1,897,745 | Williams | Feb. 14, 1933 |
| 1,907,165 | Williams | May 2, 1933 |
| 1,928,146 | Williams | Sept. 26, 1933 |
| 1,941,030 | Williams | Dec. 26, 1933 |